US009801218B2

(12) United States Patent
Tseng et al.

(10) Patent No.: US 9,801,218 B2
(45) Date of Patent: Oct. 24, 2017

(54) ESTABLISHING METHOD FOR SELF-ORGANIZATION NETWORK OF WIRELESS NODES (71) Applicant: DELTA ELECTRONICS, INC., Taoyuan County (TW)

(72) Inventors: Chao-Chun Tseng, Taoyuan County (TW); Meng-Seng Chen, Taoyuan County (TW); Bo-Syuan Huang, Taoyuan County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 132 days.

(21) Appl. No.: 14/734,499

(22) Filed: Jun. 9, 2015

(65) Prior Publication Data
US 2016/0192241 A1 Jun. 30, 2016

(30) Foreign Application Priority Data

Dec. 25, 2014 (TW) .............................. 103145390 A (51) Int. Cl.
*H04W 4/00* (2009.01)
*H04W 76/02* (2009.01)
(Continued)

(52) U.S. Cl.
CPC .......... *H04W 76/023* (2013.01); *H04W 24/02* (2013.01); *H04W 40/00* (2013.01); *H04W 84/20* (2013.01)

(58) Field of Classification Search
CPC ... H04W 76/023; H04W 40/00; H04W 84/20; H04W 24/02; H04W 84/18; H04Q 9/00;
(Continued)

(56) References Cited

U.S. PATENT DOCUMENTS 6,745,038 B2 * 6/2004 Callaway, Jr. ....... H04B 17/318
370/335
7,058,018 B1 * 6/2006 Hasty, Jr. ................ H04L 45/00
370/250
(Continued)

FOREIGN PATENT DOCUMENTS

CN 102457903 5/2012
CN 102523648 6/2012
(Continued)

OTHER PUBLICATIONS

Shahin Farahani, ZigBee Wireless Networks and Transceivers, Newnes, 2008, pp. 9, 80, 157, 216, 217, 219 and 277.*
(Continued)

*Primary Examiner* — Bob Phunkulh
(74) *Attorney, Agent, or Firm* — Hauptman Ham, LLP (57) ABSTRACT

A self-organization network establishing method comprising following steps is presented. A plurality of zone controllers (ZCs) establishes a connection, and one of the ZCs is chosen as a ZC-head. The ZC-head instructs the ZCs to enable a joining-permitted function. A plurality of wireless nodes respectively searches for one of the ZCs to join to a corresponding controller network thereof after the ZCs enable the joining-permitted function. The ZC-head collects data of the wireless nodes through the ZCs, and generates configuration messages for each wireless node based on the collected data. The ZCs disconnect all network connections after the collection is completed. Finally, each wireless node respectively re-searches for their best ZC to join to the corresponding controller network thereof according to the configuration messages.

20 Claims, 9 Drawing Sheets

(51) Int. Cl.
*H04W 24/02* (2009.01)
*H04W 84/20* (2009.01)
*H04W 40/00* (2009.01)

(58) Field of Classification Search
CPC ....... H04L 41/04; H04L 41/085; H04L 41/12; H04L 45/02
See application file for complete search history.

(56) References Cited

U.S. PATENT DOCUMENTS

| | | | | |
|---|---|---|---|---|
| 8,976,691 | B2* | 3/2015 | Norair | H04W 24/10 370/252 |
| 9,332,559 | B2 | 5/2016 | Pan et al. | |
| 2003/0083081 | A1* | 5/2003 | Sanders, III | H04M 3/2263 455/466 |
| 2003/0117966 | A1* | 6/2003 | Chen | H04L 45/02 370/255 |
| 2005/0152305 | A1* | 7/2005 | Ji | H04L 45/54 370/328 |
| 2006/0019668 | A1* | 1/2006 | Kraiem | H04L 12/40078 455/446 |
| 2009/0066473 | A1* | 3/2009 | Simons | G01S 5/0027 340/3.1 |
| 2009/0092049 | A1* | 4/2009 | Hargrave | H04L 12/66 370/235 |
| 2010/0164720 | A1* | 7/2010 | Kore | H04L 63/107 340/541 |
| 2010/0177660 | A1* | 7/2010 | Essinger | H04W 4/001 370/254 |
| 2010/0219939 | A1* | 9/2010 | Twitchell, Jr. | G06Q 10/08 340/10.1 |
| 2010/0273418 | A1* | 10/2010 | Eruchimovitch | G01S 5/0221 455/41.2 |
| 2012/0051224 | A1* | 3/2012 | Olgaard | H04L 43/50 370/241 |
| 2013/0024029 | A1* | 1/2013 | Tran | A61B 5/1113 700/278 |
| 2013/0095868 | A1* | 4/2013 | Salsbury | H04W 24/00 455/500 |
| 2013/0294285 | A1* | 11/2013 | Zhang | H04W 24/02 370/254 |
| 2014/0029434 | A1* | 1/2014 | Wang | H04W 48/18 370/236 |
| 2015/0188767 | A1* | 7/2015 | Li | H04L 41/12 370/254 |
| 2015/0200859 | A1* | 7/2015 | Li | H04L 41/0823 370/235 |
| 2015/0319730 | A1* | 11/2015 | Seine | H04W 64/003 370/338 |
| 2016/0337327 | A1* | 11/2016 | Borean | H04W 84/18 |

FOREIGN PATENT DOCUMENTS

| | | |
|---|---|---|
| CN | 103415055 | 11/2013 |
| CN | 103686211 | 3/2014 |

OTHER PUBLICATIONS

Office Action dated Mar. 1, 2016 from corresponding application No. TW 103145390.

* cited by examiner

ESTABLISHING METHOD FOR SELF-ORGANIZATION NETWORK OF WIRELESS NODES

BACKGROUND OF THE INVENTION

1. Field of the Invention

The invention relates to a self-organization network, and in particularly to a method for establishing the self-organization network.

2. Description of Prior Art

Generally, to perform smart control in a small zone, such as a room or an office, a zone controller (ZC) and one or more wireless nodes (for example, equipment controllers for controlling indoor apparatuses, or sensors for sensing environment parameters indoor or outdoor) need to be arranged in the zone. The wireless nodes collect data related to the arranged zone and provide the data to the ZC, and the ZC can adjust environment comfort degree of the arranged zone based on the collected data.

To perform the aforementioned smart control in multiple zones of a building, the ZC and wireless nodes need to be arranged in the multiple zones respectively.

In the current related art, after management people complete the physical arrangement of the ZC and wireless nodes in the multiple zones respectively, a manual configuration for the wireless nodes to connect to the ZC in each zone respectively and accurately is needed. For example, a wireless node arranged in zone A needs to connect accurately to a ZC arranged in the same zone A, otherwise the ZC cannot obtain correct data. However, the manual configuration will cost too much human resource and time.

As mentioned above, the current ZC and wireless node cannot establish an appropriate self-organization network for the arranged zone automatically after being booted, they still need the management people to set and configure manually so as to establish the connection and provide zone service in the arranged zone, it is not convenient.

SUMMARY OF THE INVENTION

The object of the present invention is to provide an establishing method for self-organization networks of wireless nodes, which can execute connections automatically and accurately for establishing the self-organization networks in each arranged zone.

To achieve the above object, the method of the present invention comprises following steps. A plurality of zone controllers (ZCs) establishes a connection, and one of the ZCs is chosen as a head zone controller (ZC-head). The ZC-head instructs the ZCs to enable a joining-permitted function. A plurality of wireless nodes respectively searches for one of the ZCs to join to a corresponding controller network thereof after the ZCs enable the joining-permitted function. The ZC-head collects data of the wireless nodes through the ZCs, and generates configuration messages for each wireless node based on the collected data. The ZCs disconnect all network connections after the collection is completed. Finally, each wireless node respectively re-searches for their best ZC to join to the corresponding controller network thereof according to the configuration messages.

Comparing with prior art, after a manager arranges multiple ZCs and wireless nodes physically in several zones of the building, the wireless nodes in the present invention can search and connect respectively to a right ZC (i.e., connect to the ZC in same zone) without the manager's manual setting. Therefore, the human resource and the time cost can be effectively saved.

Besides, the present invention generates configuration messages through the ZC-head automatically, and each of the wireless nodes respectively searches and connects to a best controller network automatically according to the configuration messages. Therefore, the wireless nodes can establish self-organization networks respectively in their arranged zone automatically after being booted, and no need for additional manual supports, which is very convenient.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
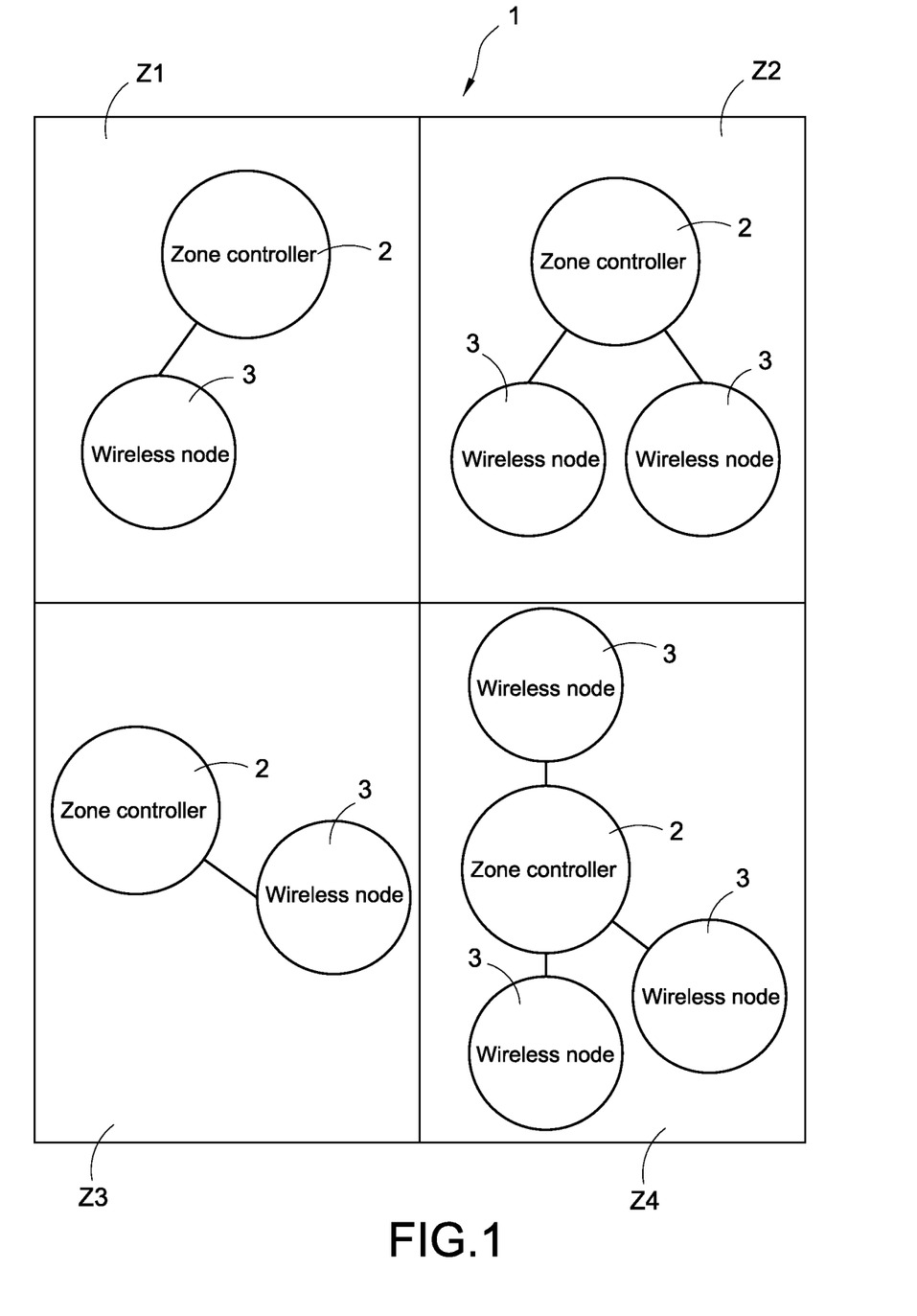
FIG. 1 is a schematic view of self-organization networks of a first embodiment according to the present invention.

FIG. 1 is a schematic view of self-organization networks of a first embodiment according to the present invention. An embodiment of FIG. 1 discloses a building 1, the building 1 comprises a plurality of zones, in particularly, comprises a first zone Z1, a second zone Z2, a third zone Z3 and a fourth zone Z4 for example in FIG. 1.

In this embodiment, the four zones Z1-Z4 respectively comprise different self-organization networks, wherein the self-organization network of the first zone Z1 comprises one zone controller (ZC) 2 and one wireless node 3 connected with the ZC 2, the self-organization network of the second zone Z2 comprises one ZC 2 and two wireless nodes 3 connected with the ZC 2, the self-organization network of the third zone Z3 comprises one ZC 2 and one wireless node 3 connected with the ZC 2, the self-organization network of the fourth zone Z4 comprises one ZC 2 and three wireless nodes 3 connected with the ZC 2. The self-organization network mentioned in the present invention is a wireless personal area network (WPAN), but not limited thereto.

As shown in FIG. 1, the self-organization networks in different zones may comprise different configurations in this embodiment, and may comprise the wireless nodes 3 of different quantities. Besides, each self-organization network may comprise only one ZC 2, but not limited thereto.

In this embodiment, the wireless nodes 3 are equipment controllers or sensors. In particularly, each sensor is used to sense environment parameters indoor or outdoor of the zone, each equipment controller is connected to electronic equipments in the zone, for example, fans, air-conditioners, lights, etc., for adjusting environment status of the zone. The ZC 2 instructs the sensor and the equipment controller in the zone based on real demands. Therefore, the environment comfort degree in the zone can be adjusted automatically through the ZC 2, the equipment controller and the sensor. According to different purposes, the self-organization network can comprise one or more equipment controllers and one or more sensors at the same time, but also can comprise only the equipment controller or the sensor.

In the embodiment of FIG. 1, each of the wireless nodes 3 is already connected to the ZC 2 arranged in the same zone, and the self-organization network is already established in the arranged zone. The present invention discloses an establishing method, which can make the ZCs 2 and the wireless nodes 3 to automatically establish the self-organization networks for their arranged zones respectively after being booted.

Figure 2:
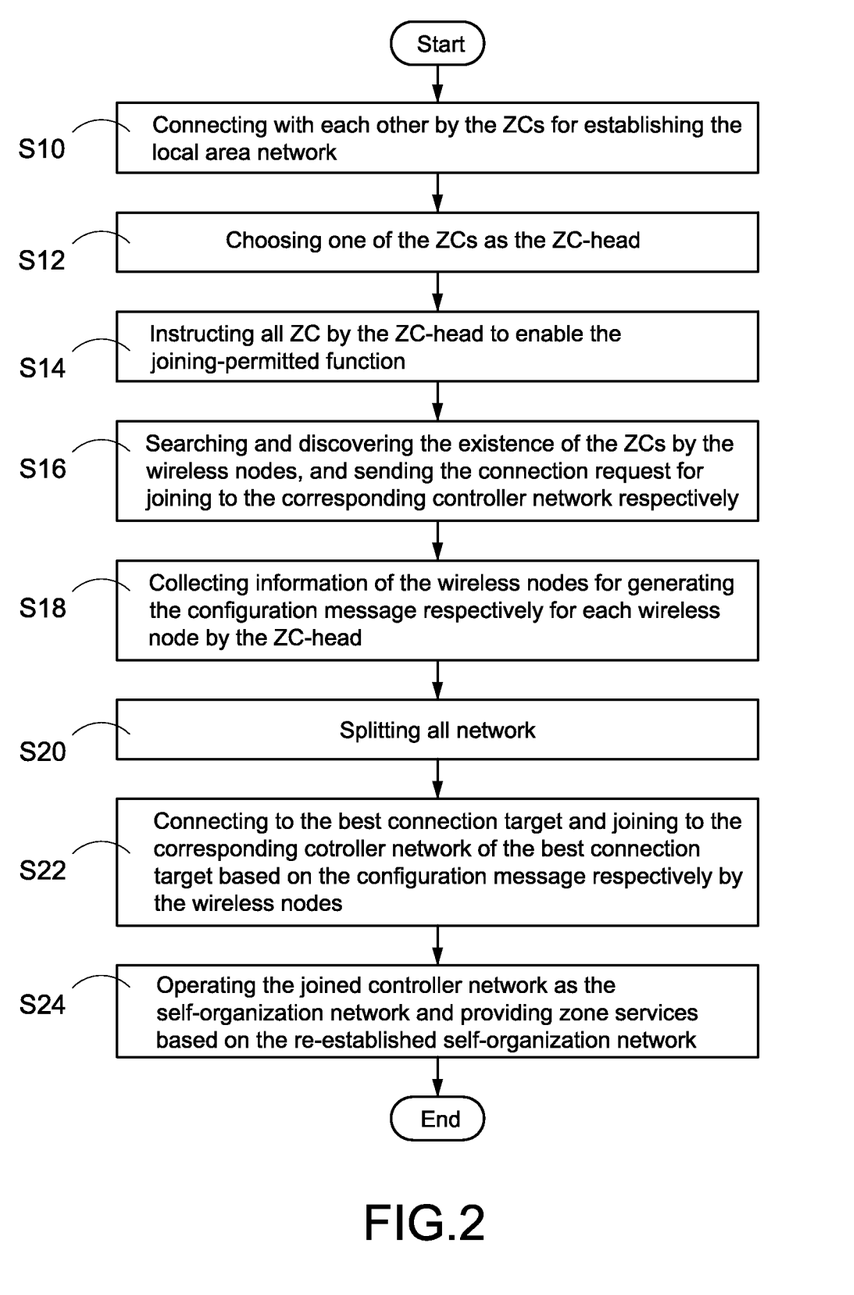
FIG. 2 is an automatic establishing flowchart of a first embodiment according to the present invention.

FIG. 2 is an automatic establishing flowchart of a first embodiment according to the present invention. Firstly, when the ZCs 2 are arranged in each zone respectively and are booted, they can connect with each other for establishing a local area network (LAN, such as the LAN 4 shown in FIG. 4) thereof (step S10). In this embodiment, the ZCs 2 are interconnected through Zigbee protocol, and each of the ZCs 2 transmits signal through same transmitting power (Tx-Power). The LAN 4 is a Zigbee network in this embodiment.

The ZCs 2 then coordinate with each other after the LAN 4 is established for choosing one of the ZCs 2 to as a ZC-head (such as the ZC-head 20 shown in FIG. 5) (step S12). It should be mentioned that if the ZCs 2 use Zigbee protocol to interconnect therewith, the ZC-head 20 is a main Zigbee coordinator defined in Zigbee protocol, and other ZCs 2 are Zigbee routers or other Zigbee coordinators defined in Zigbee protocol.

After the step S12, the ZC-head 20 sends a controlling command (such as the controlling command I1 shown in FIG. 5) to all of the ZCs 2 in the LAN 4, for instructing all of the ZCs 2 in the LAN 4 (including the ZC-head 20 itself) to enable a joining-permitted function respectively (step S14). After the step S14, the wireless nodes 3 in each zone can search and discover the existence of the ZCs 2 respectively, and send a connection request to the ZCs 2 respectively.

Figure 4:
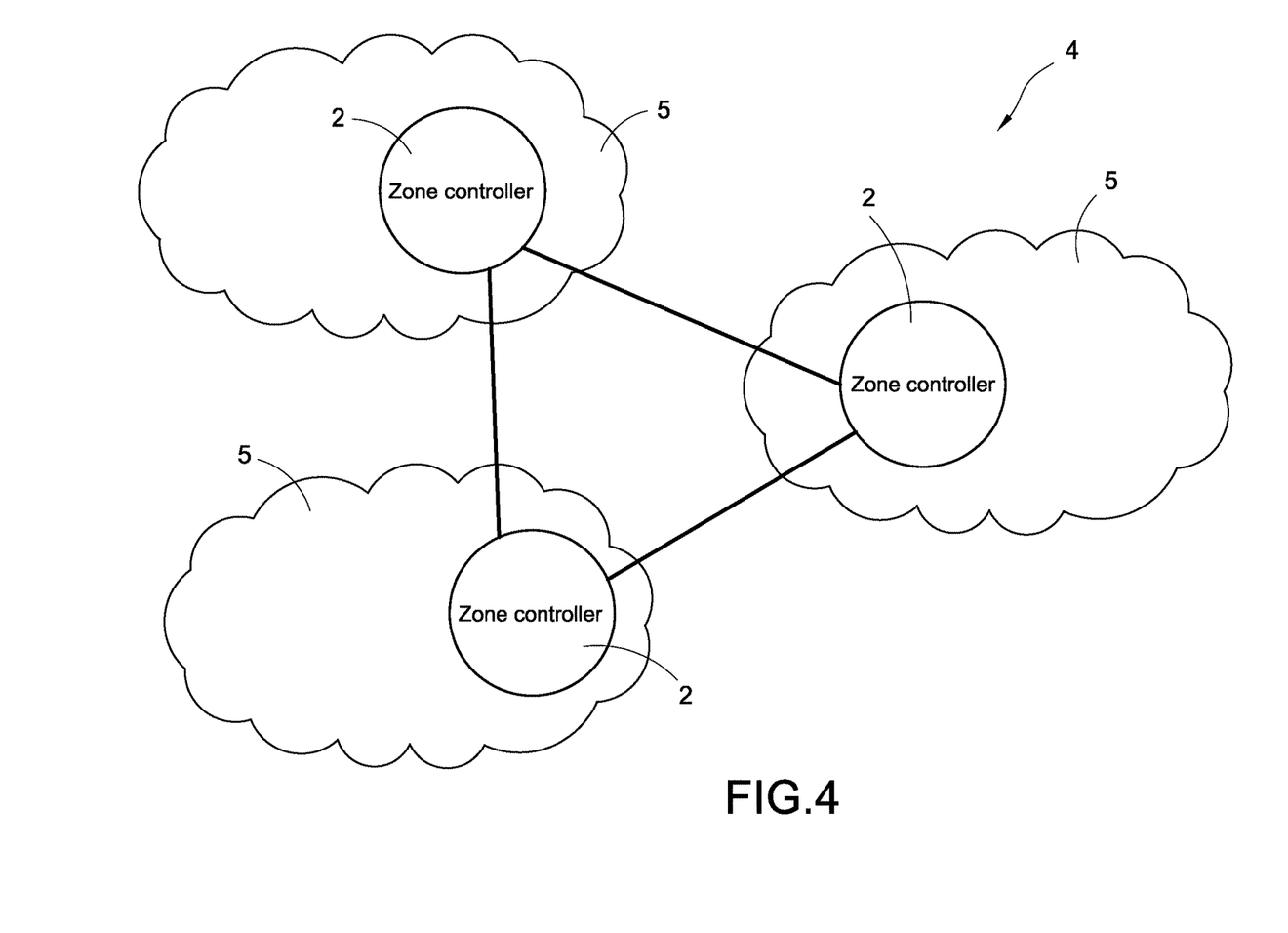
FIG. 4 is a schematic diagram showing a first establishing action of a first embodiment according to the present invention.
Figure 5:
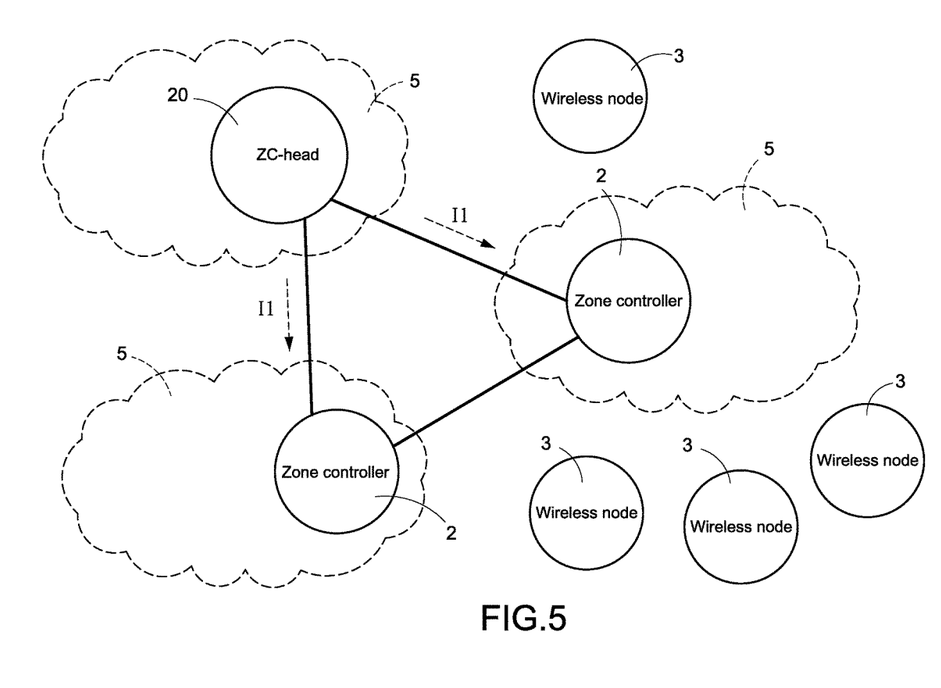
FIG. 5 is a schematic diagram showing a second establishing action of a first embodiment according to the present invention.
Figure 6:
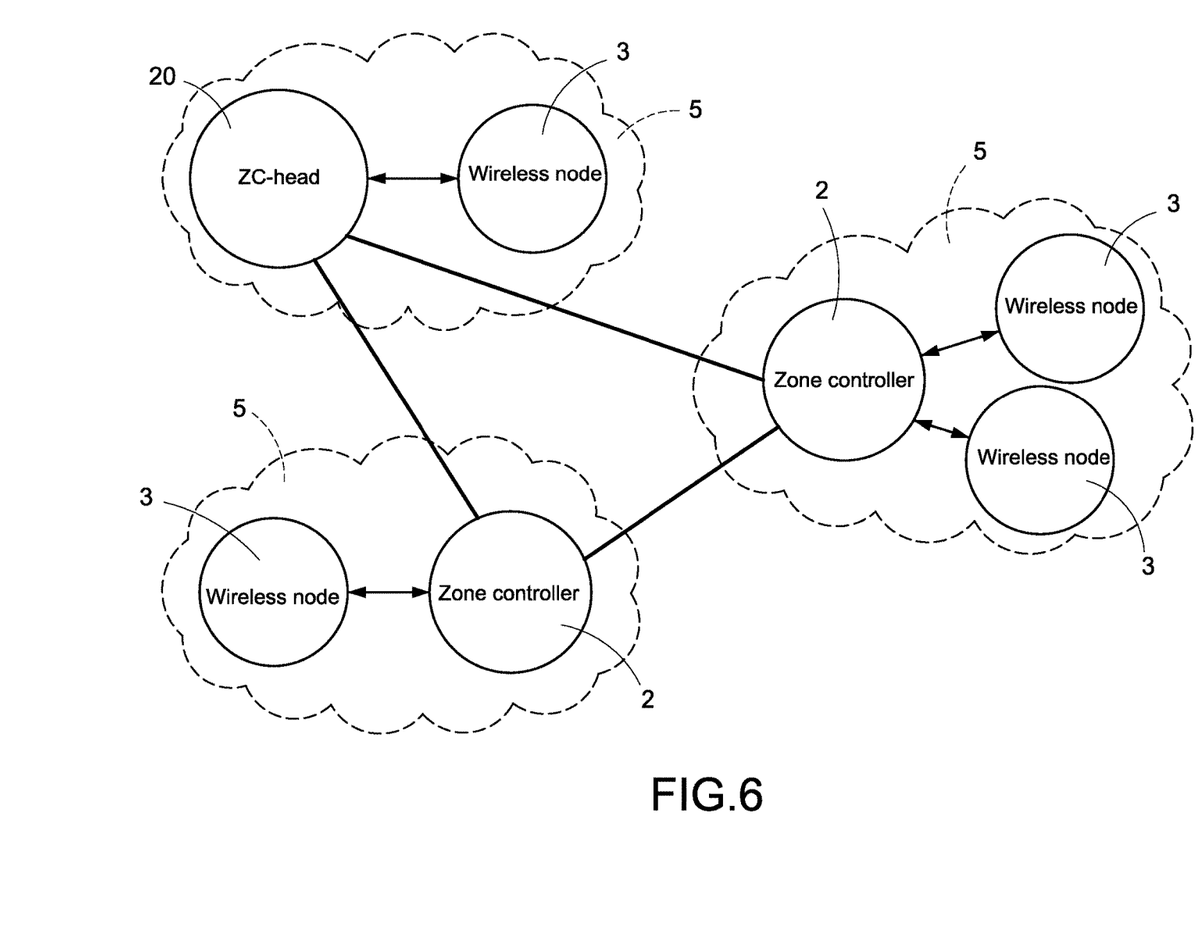
FIG. 6 is a schematic diagram showing a third establishing action of a first embodiment according to the present invention.

Please refer to FIG. 4 to FIG. 6, wherein FIG. 4 is a schematic diagram showing a first establishing action of a first embodiment according to the present invention, FIG. 5 is a schematic diagram showing a second establishing action of a first embodiment according to the present invention, FIG. 6 is a schematic diagram showing a third establishing action of a first embodiment according to the present invention. As shown in FIG. 4, the plurality of ZCs 2 can connect with each other to establish the LAN 4 mentioned above. Also, each ZC 2 establishes its own controller network 5 respectively. In the embodiment of FIG. 4, however, the ZCs 2 do not enable the joining-permitted function yet, as a result, even the wireless nodes 3 search and discover the existence of the ZCs 2, none of the wireless nodes 3 is permitted to connect with the ZCs 2 and join to the controller networks 5 at the time.

More specific, the aforementioned joining-permitted function is the function which allows equipments other than the ZCs to connect thereto. In a preferred case, if one of the ZCs 2 receives a connection request, it firstly determines whether the device sending the connection request is a ZC or not (for example, determines through identifying device code included in a received packet sent from the device). If yes, the ZC 2 permits the device to connect therewith, i.e. permits the other ZC to join to the LAN 4. However, if the device sending the connection request is not a ZC, the ZC 2 receiving the connection request determines whether the joining-permitted function is enabled or not. If yes, the ZC 2 permits the device to connect therewith, otherwise, ignores the received connection request. In other words, the ZCs 2 only permit the connection request sent from other ZC before the joining-permitted function is enabled.

As shown in FIG. 5, after the ZC-head 20 is chosen, it instructs all of the ZCs 2 (including the ZC-head 20 itself) to enable the joining-permitted function through sending the controlling command I1. As shown in FIG. 6 then, after the ZCs 2 enable their joining-permitted function (such as the step S14 shown in FIG. 2), the wireless nodes 3 can search and discover the existence of the ZCs 2 (including the ZC-head 20), and can send the connection request to any of the ZCs 2 for joining to a corresponding controller network 5 (step S16).

In particularly, the wireless nodes 3 respectively keeps searching the ZCs 2 nearby after being booted and sends the connection request to the ZCs 2 after discovering one or more of the ZCs 2 successfully. However, the ZCs 2 do not permit the connection request from the wireless nodes 3 before the joining-permitted function is enabled. After the joining-permitted function is enabled, the ZCs 2 start to permit the wireless nodes 3 to connect therewith and join to the their controller networks 5 after receiving the connection request sent from the wireless nodes 3. In this embodiment, one wireless node 3 only connects to one ZC 2. Besides, each wireless node 3 will connect to the ZC 2 which has strongest signal or is nearest to itself according to a default setting, but not limited thereto.

Go back to FIG. 2, after the step S16, the ZC-head 20 collects information of the wireless nodes 3 through the ZCs 2 in the LAN 4 (including the ZC-head 20 itself), and generates a configuration message respectively for each wireless node 3 (step S18). In particularly, the ZCs 2 (including the ZC-head 20) can connect with one or more wireless nodes 3 at the same time after enabling the joining-permitted function, and can record multiple types of information generated while signal transmission with the wireless nodes 3 and report the generated information to the ZC-head 20 after the connection with the wireless node 3 is established. Therefore, the ZC-head 20 generates the configuration messages for the wireless nodes 3 in accordance with the received information reported from the ZCs 2. In this embodiment, each configuration message respectively records a best connection target for one of the wireless nodes 3, wherein the best connection target is one of the plurality of ZCs 2 (including the ZC-head 20).

Figure 7:
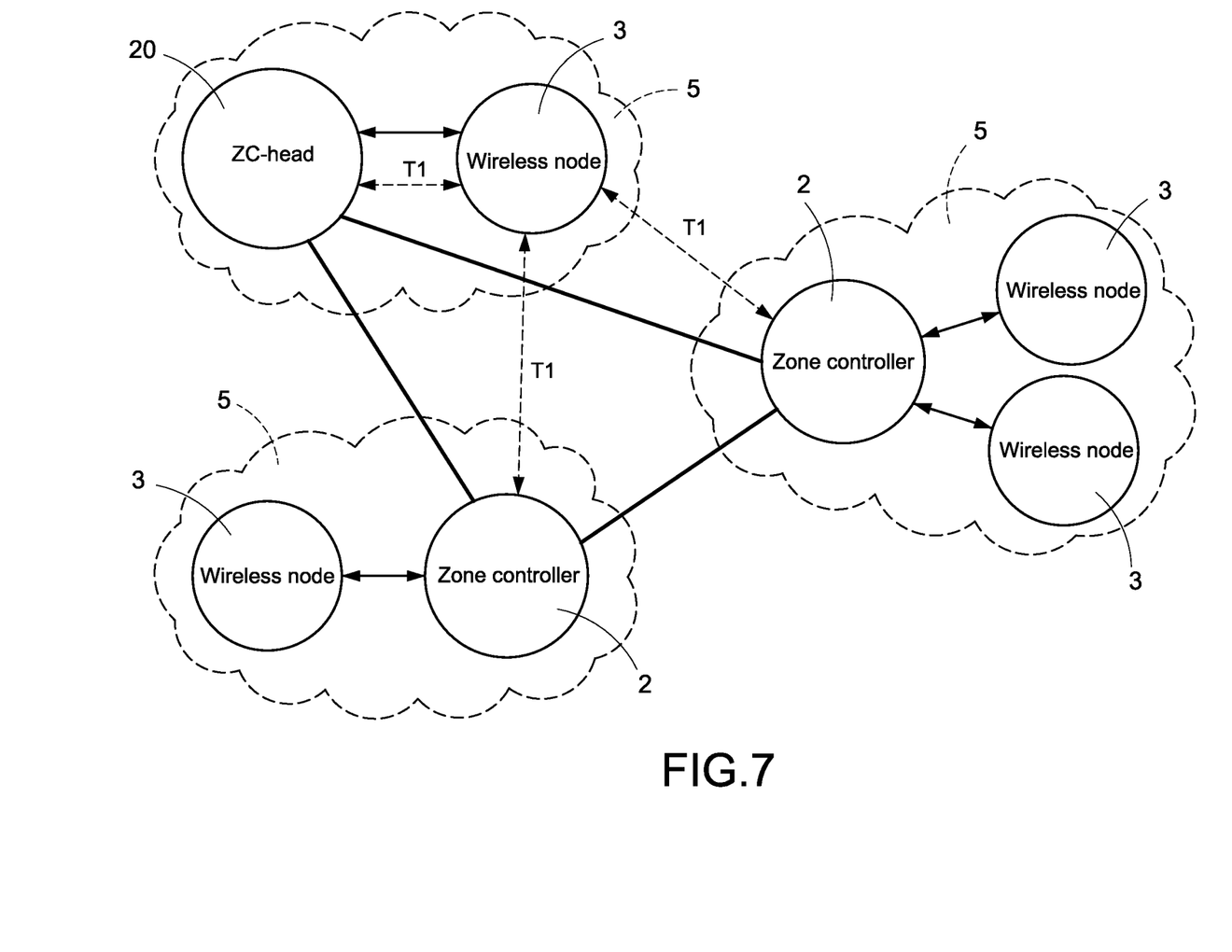
FIG. 7 is a schematic diagram showing a fourth establishing action of a first embodiment according to the present invention.

With also reference to FIG. 7, it is a schematic diagram showing a fourth establishing action of a first embodiment according to the present invention. In this embodiment shown in FIG. 7, each wireless node 3 respectively sends a testing signal T1 to all ZCs 2 in the LAN 4 (including the ZC-head 20), the ZC-head 20 and all of the rest ZCs 2 can obtain, record, and/or report aforementioned information (detailed described below) through the testing signal T1. In this embodiment, the ZC-head 20 and the rest ZCs 2 at least obtain a transmitting power (TxPower) of the wireless node 3 upon sending the testing signal T1, and record the transmitting power, or report the transmitting power to the ZC-head 20.

If all configuration messages for the wireless nodes 3 are generated completely, the ZC-head 20 sends other controlling command I1 to the ZCs 2 in the LAN 4 for the ZCs 2 (including the ZC-head 20) to split their controller network 5, and also spit the LAN 4 at the same time (step S20). More specific, although the wireless nodes 3 connect to the ZCs 2 after the ZCs 2 enable the joining-permitted function, however, the connection targets of the wireless nodes 3 are not calculated and optimized, namely, not the best connection targets. In other words, the connection relationships between the wireless nodes 3 and the ZCs 2 established in the step S16 may not satisfy the real demand of a management people, for example, one of the wireless nodes 3 and one of the ZCs 2 connected therewith may be arranged in different zones.

The main technical characteristic of the present invention is that after the configuration messages are generated completely, the present invention splits all current connections at first, then allows the wireless nodes 3 to respectively connect to their best connection target (i.e. a best ZC of the plurality of ZCs 2) based on the configuration messages, and to join the corresponding controller network 5 (step S22). After the wireless nodes 3 respectively join to their best controller network 5, each wireless node 3 can operate the joined controller network 5 as a self-organization network of the arranged zone, and provide zone services based on the re-established self-organization network (step S24).

Figure 8:
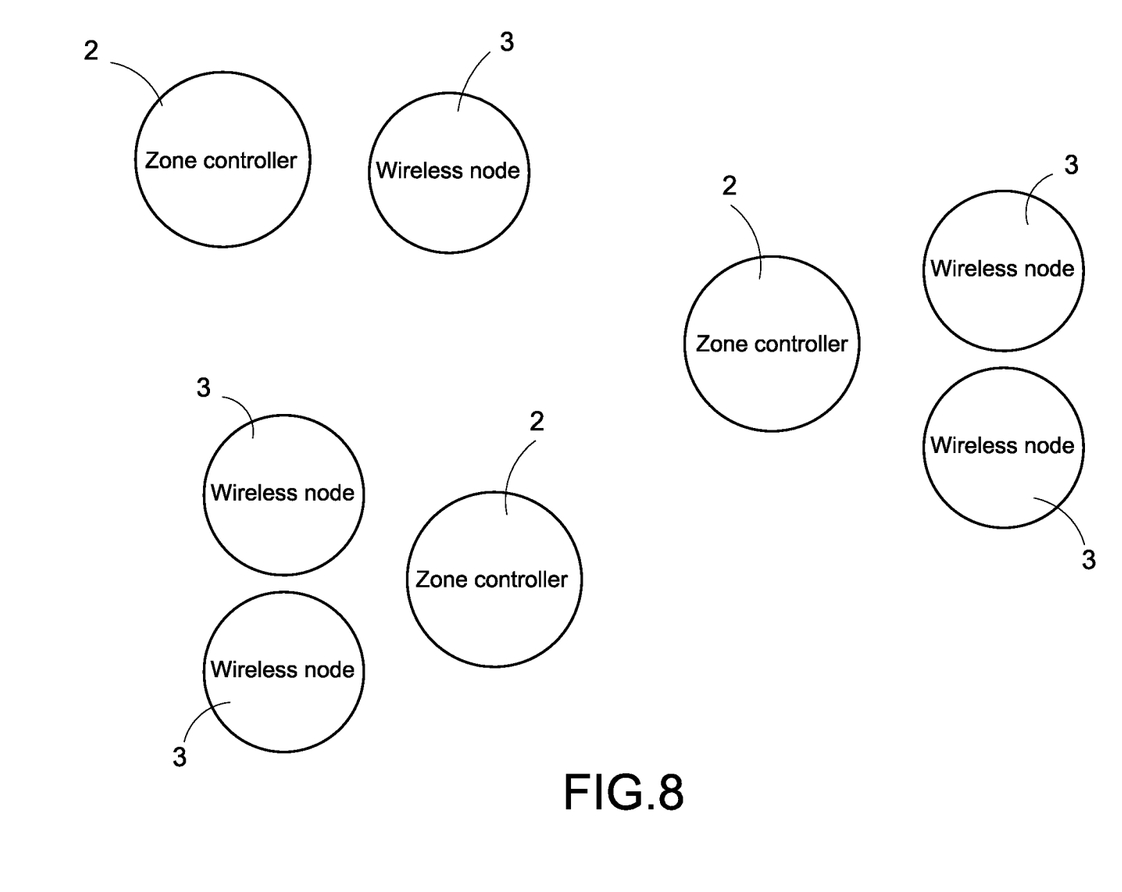
FIG. 8 is a schematic diagram showing a fifth establishing action of a first embodiment according to the present invention.
Figure 9:
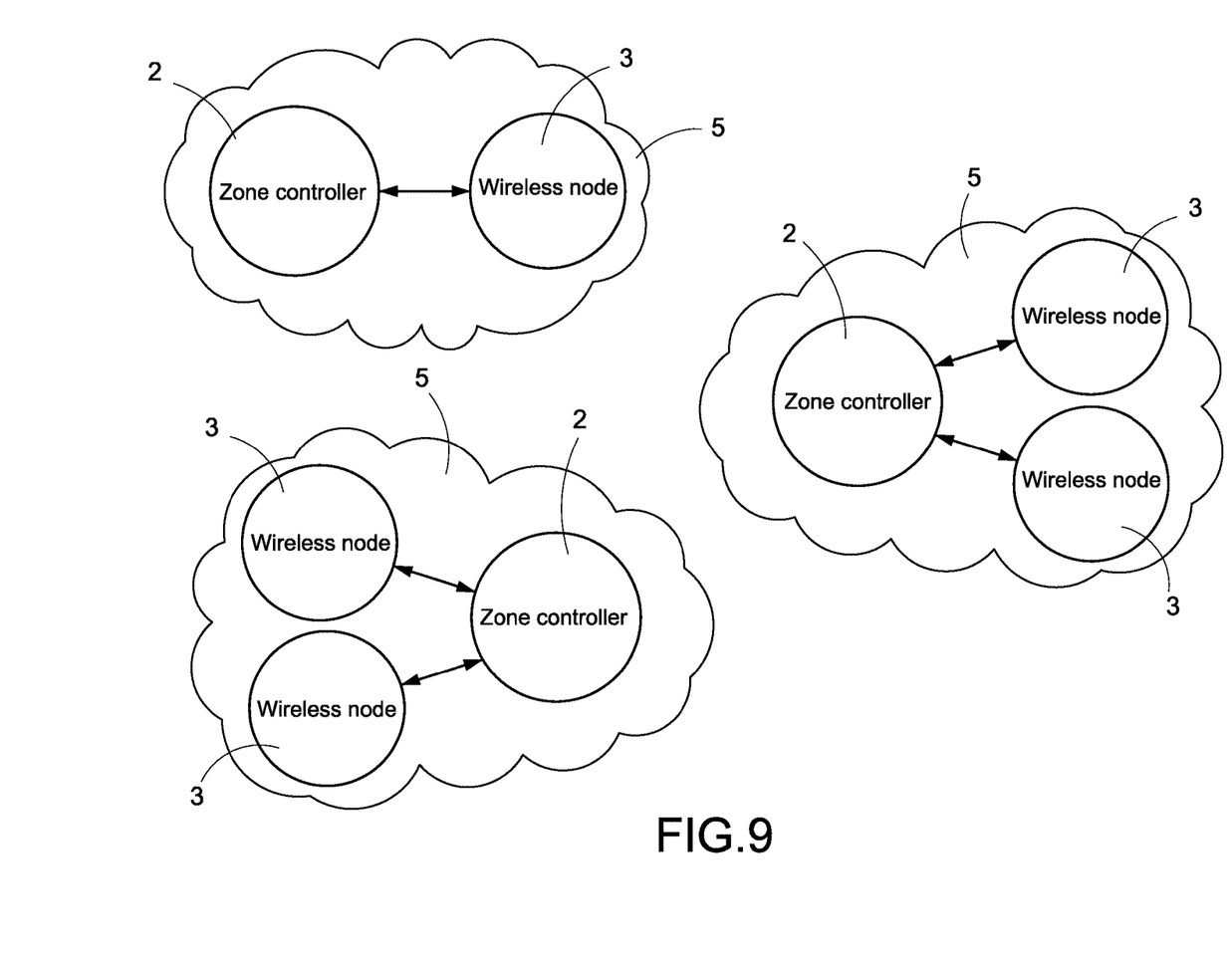
FIG. 9 is a schematic diagram showing a sixth establishing action of a first embodiment according to the present invention.

Please refer to FIG. 8 and FIG. 9, FIG. 8 is a schematic diagram showing a fifth establishing action of a first embodiment according to the present invention, FIG. 9 is a schematic diagram showing a sixth establishing action of a first embodiment according to the present invention. As shown in FIG. 8, after the configuration messages are generated completely, all of the connections (such as the LAN 4 and the controller networks 5) are split through sending the controlling command I1 by the ZC-head 20. It should be mentioned that the ZC-head 20 then recovers to a normal ZC 2 after the connections are split, and no longer to be the aforementioned main Zigbee coordinator. In this case, if the ZCs 2 connect with the wireless nodes 3 through Zigbee protocol, then each ZC 2 can be the coordinator respectively in their own self-organization network.

As shown in FIG. 9, each wireless node 3 can send the connection request to its best connection target based on the configuration message, so as to connect with the best connection target and join to the corresponding controller network 5 thereto. At the point, each ZC 2 respectively establishes the self-organization network for the arranged zone completely.

Figure 3:
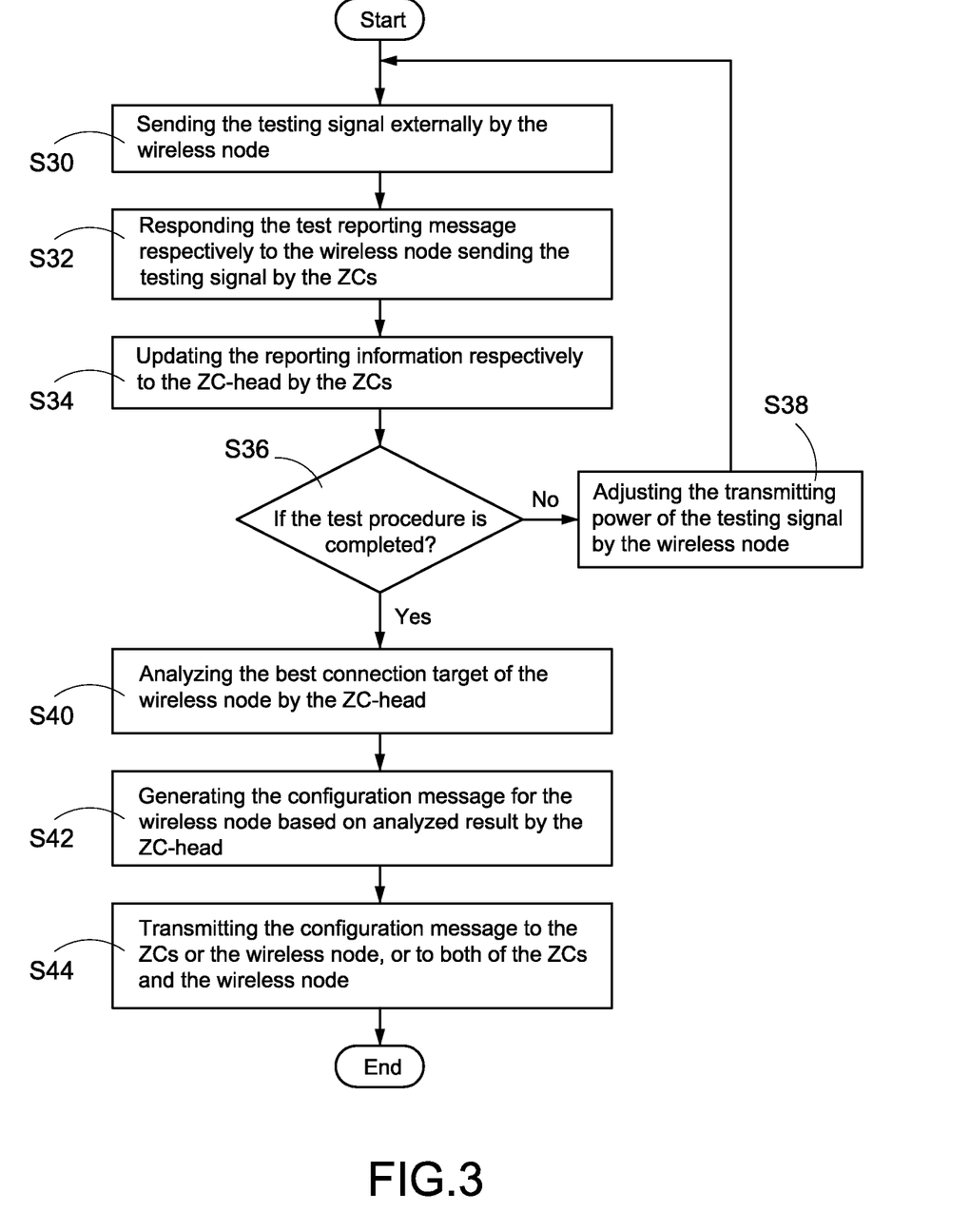
FIG. 3 is a configuring flowchart of a first embodiment according to the present invention.

FIG. 3 is a configuring flowchart of a first embodiment according to the present invention. In particularly, the steps shown in FIG. 3 are detailed descriptions for the step S18 shown in FIG. 2 mentioned above.

In the following descriptions, the quantity of the wireless nodes 3 will be exampled by one, but not intended to limit the scope of the present invention. After the step S16 shown in FIG. 2, the wireless node 3 connects to one of the plurality of ZCs 2. In this solution, the wireless node 3 uses the connected ZC 2 as a router between the wireless node 3 itself and the ZC-head 20.

After the step S16, the wireless node 3 sends the testing signal T1 externally (step S30). If the ZCs 2 near the wireless node 3 do receive the testing signal T1, they respond a test reporting message respectively to the wireless node 3 which sends the testing signal T1 (step S32). In this case, the test reporting message at least comprises device code of the ZC 2, and a received signal strength (RSS) upon receiving the testing signal T1. At the same time, each ZC 2 updates a reporting information respectively to the ZC-head 20 (step S34). In this case, the reporting information comprises device code of the wireless node 3 which sends the testing signal T1, the device code of the ZC 2 which updates the reporting information, the transmitting power the wireless node 3 used to send the testing signal T1, and the RSS, and the reporting information is used as a reference by the ZC-head 20 for generating the configuration message for the wireless node 3.

The real purpose of the execution of the step S30 and step S32 is to sift the best connection target for the wireless node 3. In particularly, the wireless node 3 sends the testing signal T1 externally via a first transmitting power (TxPower1). For a first instance, if five ZCs 2 nearby can receive the testing signal T1 sent based on the first transmitting power successfully, the wireless node 3 can then receive five groups of the test reporting message (the ZC-head 20 will receive five groups of the reporting information then). For a second instance, if only two ZCs 2 nearby can receive the testing signal T1 sent based on the first transmitting power successfully, the wireless node 3 can only receive two groups of the test reporting message (also, the ZC-head 20 will receive only two groups of the reporting information). Therefore, the present invention can achieve the effect of sifting.

For example, if only a first ZC and a second ZC of the LAN 4 can receive the testing signal T1 sent based on the first transmitting power, the wireless node 3 then can receive two groups of the test reporting message, wherein the content of the two groups of the test reporting message can be, for example, ZC1(TxPower1,RSS1) and ZC2(TxPower1,RSS1). In this embodiment, "ZC1" indicates the device code of the first ZC, "ZC2" indicates the device code of the second ZC, "TxPower1" indicates the first transmitting power, "RSS1" indicates a first received signal strength at the first ZC and the second ZC upon receiving the testing signal T1 set by the first transmitting power.

Similarly, the first ZC and the second ZC will generate the reporting information to update to the ZC-head 20 in accordance with the above information. According to the reporting information, the ZC-head 20 determines which of the plurality of ZCs is the best connection target of the wireless node 3. For example, if the RSS of the first ZC is larger than that of the second ZC upon receiving the testing signal T1 sent by the same transmitting power (such as the TxPower1), it indicates that the distance between the first ZC and the wireless node 3 is shorter than that between the second ZC and the wireless node 3. As a result, the first ZC is considered as the best connection target of the wireless node 3.

After the step S32 and the step S34, the wireless node 3 determines if the test procedure is completed or not (step S36), if not, executes following step S32, and if yes, executes following step S40.

The technical solution in the present invention is to configure the wireless node 3 to process multiple test procedures via sending signals based on different transmitting power strengths. For example, sending the testing signal T1 five times in order based on a first transmitting power strength to a fifth transmitting power strength, so as to execute the aforementioned sifting action. For instance, if sending the testing signal T1 based on a first transmitting power which has a maximum strength, the wireless node 3 can receive five groups of the test reporting message (i.e. there are five ZCs 2 receives the testing signal T1 successfully); and if sending the testing signal T1 based on a fifth transmitting power which has a minimum strength, the wireless node 3 can only receive one groups of the test reporting message (i.e. only one ZC 2 receives the testing signal T1 successfully).

If the wireless node 3 sends the testing signal T1 based on the minimum strength transmitting power, but many of the ZCs 2 can receive the testing signal T1, then the ZC-head 20 can determines which ZC 2 is the best connection target of the wireless node 3 by comparing the strength of the RSS at the ZCs 2 upon receiving the testing signal T1.

If the wireless node 3 determines the test procedure is not completed in the step S36, it adjusts the transmitting power of the testing signal T1 (step S38), and executes the procedure in the step S30 again to resend the testing signal T1 based on the adjusted transmitting power for further sifting. As mentioned above, the information related to the test procedure (such as the device code of the wireless node 3, the transmitting power of the testing signal T1, the RSS upon receiving the testing signal T1, etc.), will be routed to the ZC-head 20.

On the contrary, if the test procedure is done, the ZC-head 20 analyzes the best connection target of the wireless node 3 (step S40). More specific, the ZC-head 20 analyzes the received multiple groups of the reporting information for determining the best connection target of the wireless node 3 from the plurality of ZCs 2. In a preferred embodiment, the ZC-head 20 decides a connection target, which has a highest RSS from the wireless node 3 based on the minimum strength transmitting power (i.e., min_TxPower,max_RSS), as the best connection target of the wireless node 3.

It should be mentioned that the wireless node 3 can connect to the best connection target via the aforementioned minimum strength transmitting power, so as to save power consumption of the whole system. Else, each wireless node 3 in the building 1 can use same transmitting power to connect with their best connection target and ignores the minimum strength transmitting power, therefore, the connection standard can be unified and the management people can manage thereto more easily.

After the step S40, the ZC-head 20 generates the configuration message for the wireless node 3 based on the analyzed result (step S42). In this embodiment, the configuration message at least records media access control address (MAC address) of the wireless node 3 and/or the MAC address of the best connection target. Moreover, if the wireless node 3 and the ZCs 2 connect with each other through Zigbee protocol, the configuration message records EUI-64 code defined in Zigbee protocol of the wireless node 3 and/or the EUI-64 code of the best connection target.

After the step S42, the ZC-head 20 transmits the configuration message to the wireless node 3 or all of the ZCs 2 in the LAN 4, or transmits the configuration message to both of the wireless node 3 and the ZC2 in the LAN 4 at the same time (step S44). In particularly, the ZC-head 20 uses the ZCs 2 to route and transmit the configuration message to the wireless node 3 in this embodiment.

In a first preferred embodiment of the present invention, the ZC-head 20 only transmits the configuration message to all of the ZCs 2 in the LAN 4. Therefore, when receiving the connection request from the wireless node 3, each ZC 2 can read the configuration message at first to determine if permitting the connection request from the wireless node 3 or not (i.e., judging if the ZC 2 itself is the best connection target of the wireless node 3 or not).

In a second preferred embodiment of the present invention, the ZC-head 20 only transmits the configuration message to the wireless node 3. Therefore, the wireless node 3 can send the connection request to the best connection target directly in accordance with the content of the configuration message, so as to reduce the connection time.

In a third preferred embodiment of the present invention, the ZC-head 20 transmits the configuration message to both of the wireless node 3 and the ZCs 2 at the same time. Therefore, no matter which method mentioned above is applied to establish the connection between the wireless node 3 and its best connection target, it can execute double check after the connection is established by refer to the configuration message to make sure the connection is correct.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for establishing a self-organization network, the method comprising:
   a) connecting a plurality of zone controllers for establishing a local area network;
   b) enabling a joining-permitted function respectively by each of the zone controllers after the local area network is established;
   c) connecting to one of the plurality of zone controllers by a wireless node to join a corresponding controller network held by the connected zone controller after the joining-permitted function of the zone controllers are enabled;
   d) collecting information of the wireless node by a head zone controller of the plurality of zone controllers through the local area network and the corresponding controller network for generating a configuration message for the wireless node after the wireless node is connected to one of the zone controllers, wherein the configuration message records a best connection target of the wireless node;
   e) splitting the local area network for splitting the connection among the plurality of zone controllers after the configuration message is generated;
   e1) splitting the controller network for splitting the connection between the wireless node and the connected zone controller after the configuration messaged is generated;
   f) connecting to the best connection target by the wireless node based on the configuration message after the step e and the step e1, wherein the best connection target is one of the plurality of zone controllers; and
   g) joining to the controller network held by the best connection target by the wireless node for operating the joined controller network as a self-organization network of a located zone.

2. The method of claim 1, further comprising a step a1) after the step a: choosing one of the plurality of zone controllers as the head zone controller.

3. The method of claim 1, wherein the configuration message records a media access control address of the wireless node and a media access control address of the best connection target.

4. The method of claim 3, wherein the plurality of zone controllers are interconnected for establishing the local area network through Zigbee protocol.

5. The method of claim 4, wherein the configuration message records EUI-64 code defined in Zigbee protocol of the wireless node and the best connection target.

6. The method of claim 1, wherein the head zone controller is a main Zigbee coordinator defined in Zigbee protocol, the rest of zone controllers are Zigbee routers or other coordinators defined in Zigbee protocol.

7. The method of claim 1, wherein the plurality of zone controllers use same transmitting power (TxPower) for signal transmission.

8. The method of claim 1, wherein the wireless node is an equipment controller or a sensor, and the wireless node is arranged with the best connection target in a same zone.

9. The method of claim 1, wherein in the step c, the wireless node connects to one of the plurality of zone controllers having strongest signal or nearest to itself according to a default setting.

10. The method of claim 1, wherein the step d comprises following steps:
  d1) sending a testing signal externally by the wireless node;
  d2) responding a test reporting message to the wireless node respectively by the plurality of zone controllers when receiving the testing signal successfully, wherein each test reporting message at least comprises device code of the zone controller responding the test reporting message, and received signal strength upon receiving the testing signal; and
  d3) updating a reporting information to the head zone controller through the local area network respectively by the plurality of zone controllers when receiving the testing signal, wherein each reporting information at least comprises device code of the wireless node, device code of the zone controller updating the reporting information, transmitting power of the testing signal, and received signal strength upon receiving the testing signal.

11. The method of claim 10, wherein the step d further comprises following steps:
  d4) determining if a test procedure is completed or not by the wireless node after the step d1; and
  d5) adjusting the transmitting power of the testing signal and sending the testing signal again via the adjusted transmitting power by the wireless node if the test procedure is not completed.

12. The method of claim 10, wherein the step d further comprises following steps:
  d6) analyzing the reporting information by the head zone controller after the step d3 for determining the best connection target of the wireless node from the plurality of zone controllers;
  d7) generating the configuration message based on analyzed result, wherein the configuration message records a media access control address of the wireless node and a media access control address of the best connection target; and
  d8) transmitting the configuration message to the zone controllers or the wireless node, or to both of the zone controllers and the wireless node at the same time.

13. The method of claim 12, wherein the head zone controller decides one of the plurality of zone controllers having a highest received signal strength from the wireless node based on a minimum strength transmitting power (min_TxPower,max_RSS) as the best connection target of the wireless node.

14. The method of claim 13, wherein in the step f, the wireless node connects to the best connection target through the minimum transmitting power.

15. A method for establishing a self-organization network, the method comprising:
  a) choosing a head zone controller from a plurality of zone controllers, wherein the plurality of zone controllers interconnect with each other for establishing a local area network, and each zone control establishes a controller network respectively;
  b) sending a controlling command by the head zone controller to the plurality of zone controllers to enable a joining-permitted function of each zone controller;
  c) accepting a connection request from a wireless node and permitting the wireless node to join to the corresponding controller network by one of the plurality of zone controller after the step b;
  d) collecting information of the wireless node through the local area network by the head zone controller, and determining a best connection target of the wireless node from the plurality of zone controllers based on the collected information;
  e) sending the controlling command by the head zone controller to the plurality of zone controllers after the step d to split the local area network for splitting the connection among the plurality of zone controllers;
  e1) sending the controlling command by the head zone controller to the plurality of zone controllers after the step d to split the controller networks for splitting the connection between the wireless node and the connected zone controller;
  f) resending the connection request by the wireless node to the best connection target for connecting with the best connection target after the step e and the step e1; and
  g) joining to the controller network of the best connection target by the wireless node and operating the joined controller network as a self-organization network of a located zone.

16. The method of claim 15, wherein the step d comprises following steps:
  d1) sending a testing signal externally by the wireless node;
  d2) updating a reporting information to the head zone controller through the local area network respectively by the plurality of zone controllers when receiving the testing signal, wherein each reporting information at least comprises device code of the wireless node, device code of the zone controller updating the reporting information, transmitting power of the testing signal, and received signal strength upon receiving the testing signal;
  d3) determining if a test procedure of the wireless node is completed after the step d2;
  d4) adjusting a transmitting power of the testing signal by the wireless node if the test procedure is not completed and re-executing the step d1 to the step d3 based on the adjusted transmitting power;
  d5) analyzing the received reporting information by the head zone controller after the test procedure is completed for determining the best connection target of the wireless node from the plurality of zone controllers;

d6) generating a configuration message based on analyzed result, wherein the configuration message records a media access control address of the wireless node and the best connection target; and d7) transmitting the configuration message to the plurality of zone controllers or the wireless node, or to both of the plurality of zone controllers and the wireless node at the same time.

17. The method of claim 16, wherein the plurality of zone controllers are interconnected for establishing the local area network through Zigbee protocol, and the configuration message records EUI-64 code defined in Zigbee protocol of the wireless node and the best connection target.

18. The method of claim 17, wherein the head zone controller is a main Zigbee coordinator defined in Zigbee protocol, the rest of zone controllers are Zigbee routers or other Zigbee coordinators defined in Zigbee protocol.

19. The method of claim 16, wherein the wireless node is an equipment controller or a sensor, and is arranged with the best connection target in same zone.

20. The method of claim 16, wherein the head zone controller decides one of the plurality of zone controllers having a highest received signal strength from the wireless node based on a minimum strength transmitting power (min_TxPower,max_RSS) as the best connection target of the wireless node in the step d5.

* * * * *